United States Defensive Publication [19] (H) [11] T100,805

Mann, Jr. et al. [43] Jul. 7, 1981

[54] CLARIFICATION OF BLACK AMMONIUM POLYPHOSPHATE LIQUIDS RECYCLING OF BYPRODUCT TOPS

[76] Inventors: Horace C. Mann, Jr., Box 345, Rte. 4, Killen, Ala. 35645; Kenneth E. McGill, Rte. 1, Box 163, Virginia Shores, Sheffield, Ala. 35660

[21] Appl. No.: 194,304

[22] Filed: Oct. 6, 1980

[51] Int. Cl.[3] ..... C05B 7/00

[52] U.S. Cl. ..... 71/34; 71/64 C; 423/305

[57] ABSTRACT

The process allows essentially all of the nitrogen and $P_2O_5$ values in the treated black ammonium polyphosphate liquid to be recovered in the form of valuable clarified product. In the process, a heel of black liquid fertilizer is first clarified by a prior-art procedure using flocculants. The improvement over the prior art picks up with the byproduct tops which is then diluted with the water of formulation required to dissolve additional amounts of ammonium polyphosphate melt. This diluted liquid is filtered, the filter cake containing upwards of 99 percent of the undesirable black carbonaceous material is discarded, and the clear filtrate, which contains essentially all of the nitrogen and $P_2O_5$ originally in the tops, is then used in lieu of the prior-art water of formulation to dissolve additional ammonium polyphosphate melt to produce more black ammonium polyphosphate liquid.

9 Claims, 1 Sheet Drawing,

30 Pages Specification

The file of this unexamined application may be inspected and copies thereof may be purchased (849 O.G. 1221, Apr. 9, 1968).

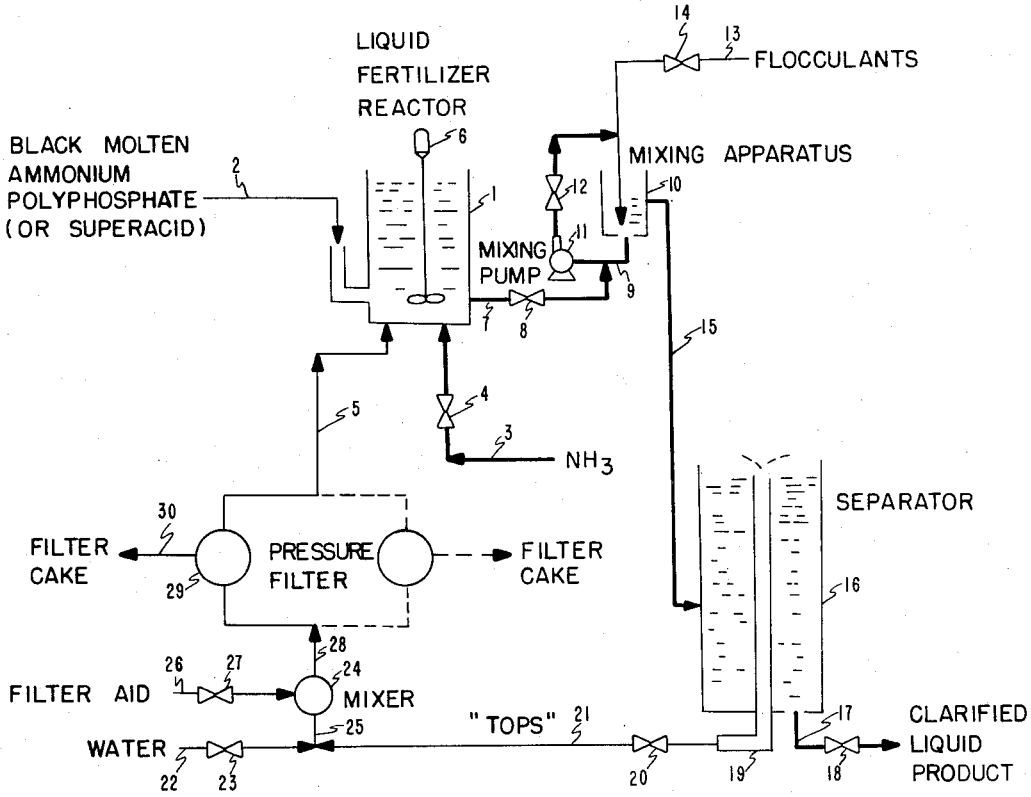

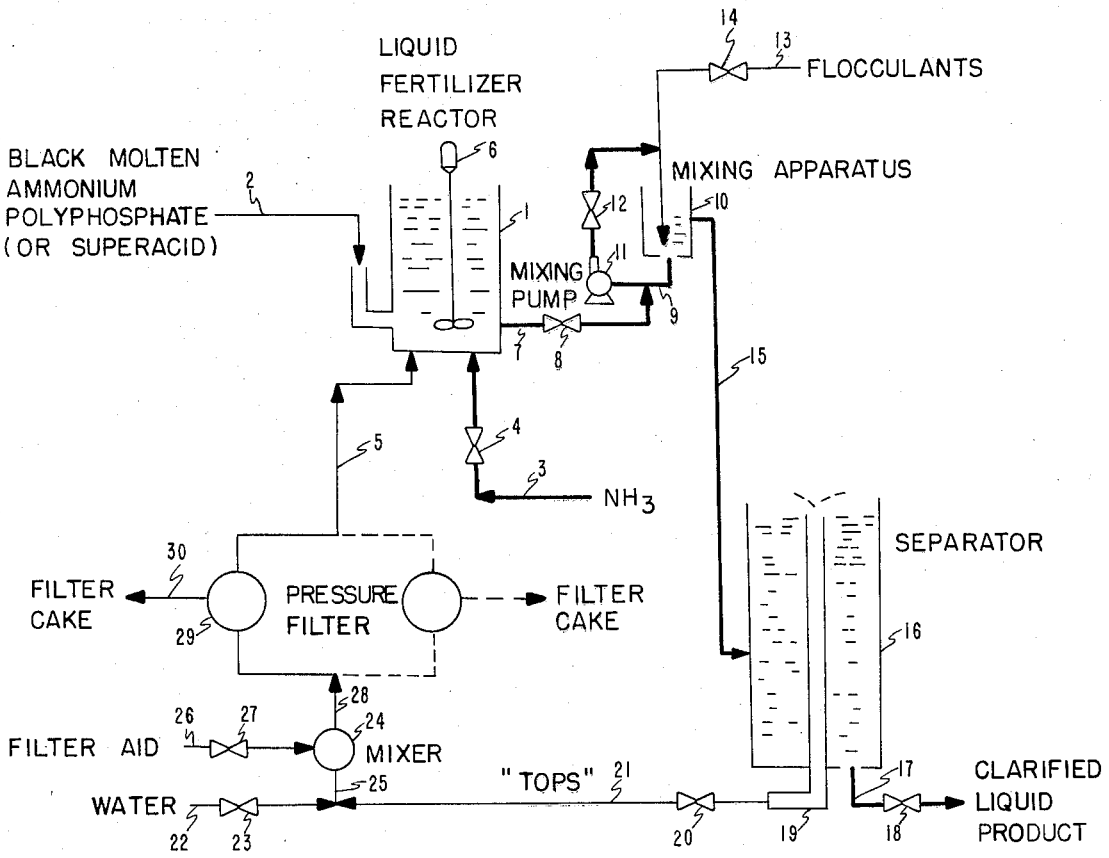
LIQUID
FERTILIZER
REACTOR
BLACK MOLTEN
AMMONIUM
POLYPHOSPHATE
(OR SUPERACID)
FLOCCULANTS
MIXING APPARATUS
MIXING
PUMP
NH3
SEPARATOR
FILTER
CAKE
PRESSURE
FILTER
FILTER
CAKE
FILTER AID
MIXER
WATER
"TOPS"
CLARIFIED
LIQUID
PRODUCT